United States Patent [19]

Taig

[11] Patent Number: 4,643,699
[45] Date of Patent: Feb. 17, 1987

[54] UNIVERSAL JOINT HAVING A BEARING BLOCK WITH CYLINDRICAL RECEPTACLES

[75] Inventor: Alistair G. Taig, South Bend, Ind.

[73] Assignee: Allied Corp., Morristown, N.J.

[21] Appl. No.: 775,967

[22] Filed: Sep. 13, 1985

[51] Int. Cl.⁴ .............................................. F16D 3/26
[52] U.S. Cl. .................................... 464/112; 464/125
[58] Field of Search ................... 74/492, 493; 403/57, 403/74; 464/8, 106, 112, 125, 126, 136, 147, 155

[56] References Cited

U.S. PATENT DOCUMENTS

| | | | |
|---|---|---|---|
| 896,195 | 8/1908 | Bogart | 464/126 |
| 1,309,826 | 7/1919 | Urschel | 464/126 |
| 1,741,099 | 12/1929 | Curlee | 464/126 |
| 1,830,394 | 11/1931 | Glass | 464/106 |
| 1,913,783 | 6/1933 | Williams | 464/125 X |
| 1,988,967 | 1/1935 | Emrick | 464/112 X |
| 2,092,704 | 9/1937 | Ricefield | 464/76 |
| 2,996,900 | 8/1961 | Fermier | 464/76 |
| 3,431,751 | 3/1969 | Stokely | 464/8 |
| 3,461,688 | 8/1969 | Garfinkle | 464/125 |
| 3,525,238 | 8/1970 | Cruz | 464/85 |
| 4,135,372 | 1/1979 | Benson | 464/112 X |
| 4,498,888 | 2/1985 | Pastor | 464/112 |

FOREIGN PATENT DOCUMENTS 882158  7/1953  Fed. Rep. of Germany ...... 464/125

Primary Examiner—Stuart S. Levy
Assistant Examiner—Daniel P. Stodola
Attorney, Agent, or Firm—Larry J. Palguta; Ken C. Decker

[57] ABSTRACT

The universal joint (10) comprises a bearing block (40) which has a pair of cylindrical receptacles (50, 60) disposed perpendicularly relative to one another, each cylindrical receptacle (50, 60) being C-shaped to receive therein respective cylindrical members (14, 16; 34, 36) of two rotatable members (12, 30). The bearing block (40) includes a circumferential wall (70) extending between adjacent ends of each cylindrical receptacle (14, 16; 34, 36) in order to provide grooves (74) for capturing and retaining a securement ring (80). An alternative embodiment (110) provides a rotatable member (112) having a hemispherical head (113) with an interior cavity (117), the hemispherical head (113) having transverse openings (118) for the reception of a pin (125) which extends through a receptacle (160) of the bearing block (140) to rotatably secure the block (140) within the interior cavity (117). The cylindrical members (134, 136) of the other rotatable member (130) are captured within the other cylindrical receptacle (150) of the bearing block (140) and the securement ring (180) secured in the grooves (174) and about the circumference of the bearing block (140).

7 Claims, 4 Drawing Figures

UNIVERSAL JOINT HAVING A BEARING BLOCK WITH CYLINDRICAL RECEPTACLES

This invention relates to a universal joint having a bearing block and securement ring to rotatably couple together two rotatable members, and is particularly useful for a steering column of a motor vehicle.

Universal joints have been designed for use in the steering column of a motor vehicle, in order that the steering column may be tilted or adjusted according to the desires of the vehicle driver. The manufacture of many U-joints requires the fabrication of a significant number of component parts, numerous machining operations in the fabrication of the parts and assembly of the joint, and classification of parts during subassembly operations so that the parts, according to their dimensions, are properly matched with other parts of the assembly. Therefore, it is desirable to produce a universal joint suitable for use within the steering column, and which eliminates or minimizes many of the problems inherent in the prior universal joint designs, in addition to providing an easily manufactured, reliable, and inexpensive universal joint useful in automotive applications.

The present invention comprises a universal joint having a pair of shafts each terminating in a pair of spaced-apart arms located at an end and each spaced-apart arm including a cylindrical member lying along a common axis, a bearing block comprising a pair of C-shaped cylindrical receptacles each disposed perpendicularly relative to the other, the cylindrical receptacles connected by a circumferentially extending wall which has a groove therein, and a securement ring seated in the groove. The cylindrical members of each rotatable member are disposed and captured within a respective cylindrical receptacle, and the securement ring disposed within the groove so that it extends about the circumferential perimeter of the bearing block to capture and retain securely the cylindrical members within the respective cylindrical receptacles. An alternative embodiment provides a first rotatable member terminating and a hemispherical head having an interior cavity therein, with a pair of transverse openings disposed in the head and communicating with the interior cavity, the bearing block disposed within the interior cavity and captured therein by means of a pin which extends through and between the transverse openings and an associated cylindrical receptacle to rotatably capture and maintain the bearing block within the interior cavity, a second rotatable member terminating in a pair of spaced arms each having a cylindrical member lying along a common axis, the cylindrical members received within an associated cylindrical receptacle, and a securement ring disposed within the groove of the circumferentially extending transverse wall in order to secure the cylindrical members of the second rotatable member within the respective cylindrical receptacle.

The universal joint of the present invention provides many substantial advantages over prior universal joints. The total number of parts are reduced to a minimum, subassembly operations and the classification of parts are minimized or completely eliminated, the final assembly procedure is greatly simplified because adjustments are not necessary, and no lubrication is required for the universal joint. The first and second shafts of the universal joint may be simply and quickly manufactured at a very low cost, and manufacturing tolerances are easily taken up to eliminate lash by the compressive action of the external securement ring. The universal joint provides a robust construction with an angular capability of approximately 40° of articulation.

The invention is described in detail below with reference to the drawings which illustrate two embodiments, in which.

Figure 1:
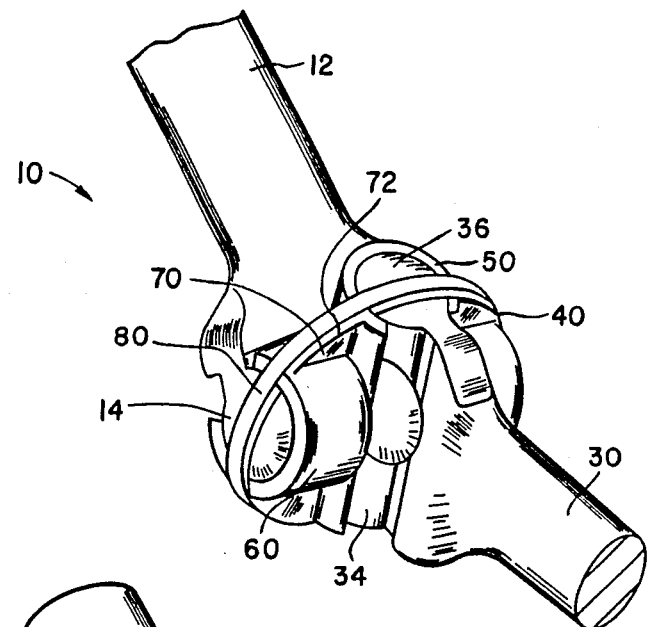
FIG. 1 is an isometric view of the universal joint of the present invention.
Figure 2:
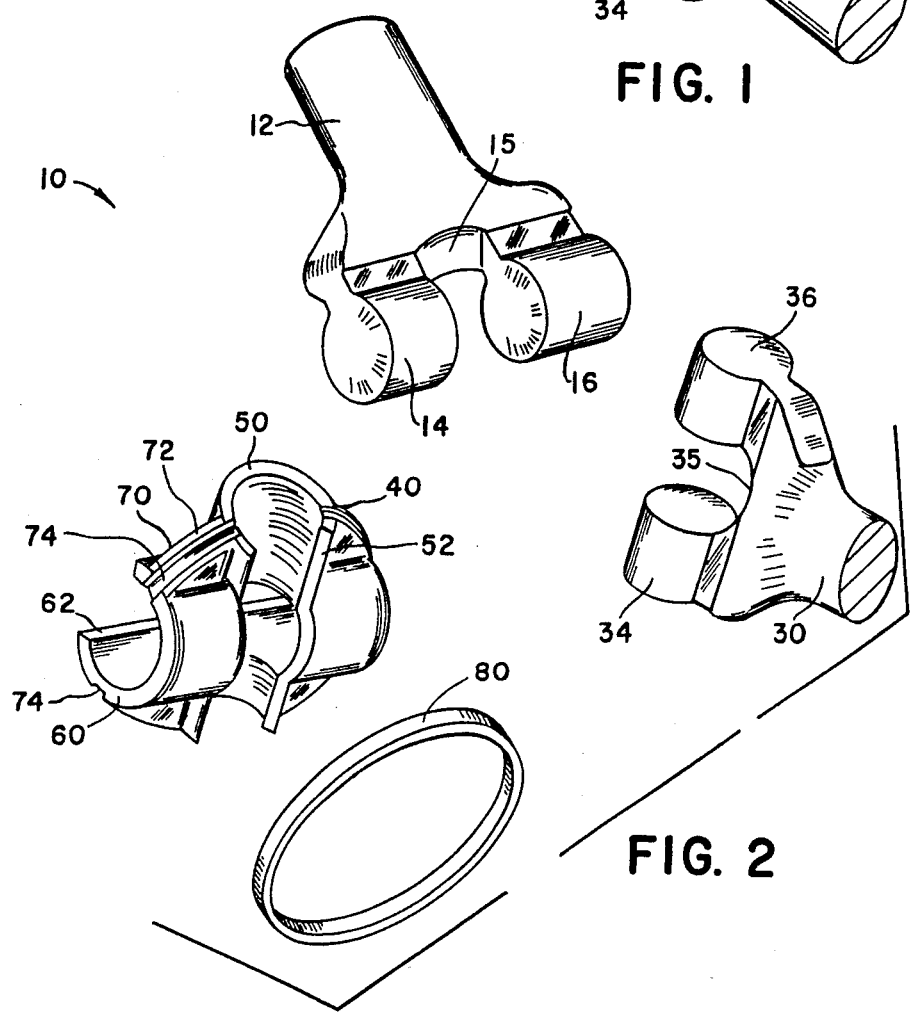
FIG. 2 is an exploded view of the universal joint of FIG. 1.

The universal joint is designated generally by reference numeral 10 in FIGS. 1 and 2. A first shaft 12 and second shaft 30 each terminate in a pair of cylindrical members 14, 16, and 34, 36, respectively. Each of the cylindrical members 14, 16, and 34, 36, are disposed along respective common axes. Cylindrical member 14 is spaced apart from cylindrical member 16 by open area 15, and cylindrical member 34 is spaced apart from cylindrical member 36 by open area 35. A bearing block 40 comprises a pair of cylindrical receptacles 50 and 60 disposed perpendicularly relative to one another. The bearing block 40 is made of reinforced plastic material such as Nylon ® or any other material having sufficient strength and stability for the present application. Cylindrical receptacles 50 and 60 are generally C-shaped with each having an opening 52 or 62 permitting the cylindrical members 14, 16, and 34, 36 to be received therein. The bearing block 40 includes a circumferentially extending wall 70 which extends longitudinally relative to receptacles 50, 60. The wall 70 extends radially outwardly so that wall end 72 joins portions of adjacent ends of the cylindrical receptacles. Wall end 72 includes therein circumferential grooves 74 which extend between the ends of adjacent receptacles. As illustrated in FIG. 1, cylindrical members 14, 16, and 34, 36 are captured within respective cylindrical receptacles 60, 50 and a securement ring 80 is disposed about the circumferential perimeter of bearing block 40. Securement ring 80 is received within the grooves 74 so that ring 80 extends over the ends of the cylindrical members captured within the respective cylindrical receptacles.

Figures 3, 4:
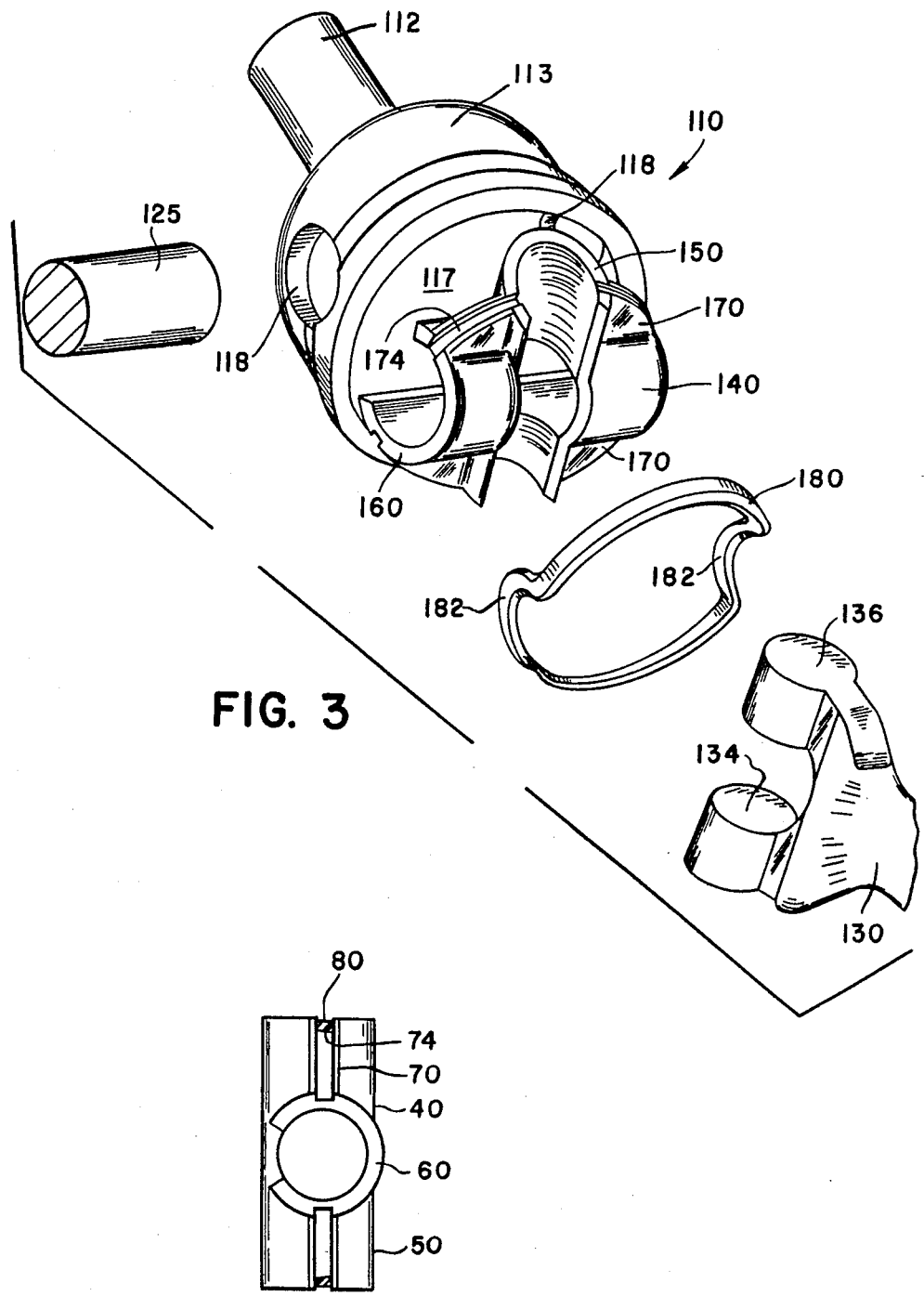
FIG. 3 is an exploded view of an alternative embodiment of the universal joint of FIG. 1.
FIG. 4, is a schematic transverse view of a tapered securement ring received within a complementary-shaped groove of the bearing block.

Assembly of universal joint 10 is accomplished by inserting the cylindrical members 14, 16, and 34, 36 within their associated cylindrical receptacles of bearing block 40, and then placing the securement ring 80 within the grooves 74 in order to securely capture and retain the cylindrical members within the associated cylindrical receptacles. The universal joint 10 provides an angular capability of approximately 40° of articulation of one shaft relative to the other (edges of the open portion of each receptacle providing rotational limit stops), and does not require lubrication if a plastic bearing block 40 is utilized. Additionally, the plastic bearing block may be very simply manufactured by broaching operations which pass through the block in order to provide the cylindrical receptacles. The securement ring 80 may be snap fitted into the grooves 74 in order to take up manufacturing tolerances and eliminate free lash in the universal joint. Securement ring 80 can be either a metal ring or a stiff spring ring placed about the circumferential perimeter of bearing block 40 in order to capture the cylindrical members in their respective cylindrical receptacles. As illustrated in FIG. 4, ring 80 may have a tapered shape in the transverse direction in order that it can be snap fitted and securely retained within complementary-shaped grooves 74 illustrated in FIG. 4.

FIG. 3 illustrates an alternative embodiment of the universal joint of the present invention. Universal joint 110 comprises a first shaft 112 and a second shaft 130, the first shaft 112 terminating in a hemispherical head 113 having an interior cavity 117 and the second member terminating in a pair of cylindrical members 134 and 136 spaced apart along a common axis. The second head 113 includes a pair of transverse openings 118 which extend through the head and communicate with interior cavity 117. A bearing block 140 includes a pair of cylindrical receptacles 150 and 160 disposed perpendicularly relative to one another. The bearing block 140 of universal joint 110 is identical to the bearing block previously described. Bearing block 140 includes circumferential wall 170 having circumferential grooves 174 therein. The bearing block is disposed within interior cavity 117, with pin member 125 extending through and received in transverse openings 118 and cylindrical receptacle 160. Pin member 125 retains rotatably bearing block 140 within the interior cavity 117, while cylindrical members 134 and 136 are captured within the cylindrical receptacle 150. In order to secure the cylindrical receptacles 150, 160 about the cylindrical members 134, 136 and the pin member 125, a ring 180 is disposed within grooves 174. The ring 180 exerts a compressive force radially inwardly along grooves 174 to insure that the C-shaped cylindrical receptacles 150, 160 remain snugly about cylindrical members 134 and 136 and pin 125. In addition, securement ring 180 extends over the ends of cylindrical members 134, 136 in order to retain them in place relative to the longitudinal dimension of the cylindrical receptacle 150. Securement ring 180 has a pair of curved portions 182 which are designed to extend around portions of the perimeter of pin 125 so that pin 125 may extend between openings 118 and through cylindrical receptacle 160.

Universal joint 110 is assembled by placing cylindrical members 134, 136 of shaft 130 within cylindrical receptacle 150 and fitting securement ring 180 within the grooves 174. Then the subassembly comprising shaft 130, bearing block 140 and securement ring 180 are inserted within interior cavity 117 so that the pin 125 may be passed through the opening 118, cylindrical receptacle 160, and received in the opposite opening 118. Pin 125 may be secured within the opening 118 by any one of several well-known methods. The universal joint 110 provides the same advantages, capabilities, and characteristics described above for universal joint 10.

The securement rings 80 and 180 can be provided by a number of alternative means. A spring ring can be utilized in place of rings 80 and 180, and as described above in relation to FIG. 4, the rings may have a tapered shape in the transverse direction so that they may be snap fitted into the grooves. Additionally, securement rings 80 and 180 may be made of metallic compositions such as aluminum, copper, or any other highly electrically conductive material so that they can be shrunk by the Magnaform ® process which provides an extremely tight and secure retainment by the ring. Also, a swaged steel cover could be utilized in place of the rings 80 and 180.

The universal joint of the present invention comprises as few as four separate members which are easily manufactured and assembled at a very lost cost. The universal joint has a robust construction, provides an angular capability of approximately 40° of articulation, requires no lubrication when a plastic bearing block is utilized, and provides the capability for the quick take-up of manufacturing tolerances in accordance with the method of manufacture. Thus, the universal joint of the present invention provides greatly simplified structures which are easily and inexpensively manufactured with highly predictable and controllable functional and structural characteristics.

Although this invention has been described in connection with the illustrated embodiments, it will be obvious to those skilled in the art that various changes may be made in the form, structure, and arrangement of parts without departing from the invention.

I claim:

1. A universal joint comprising first and second rotatable members capable of being rotated with their axes angularly disposed with respect to one another, the first rotatable member including a head having an opening communicating with an interior cavity, the head having a pair of openings extending transversely through said head and communicating with said interior cavity, the second rotatable member having a pair of spaced-apart arms located at an end and each spaced-apart arm including a cylindrical member lying along a common axis, characterized in that the joint includes a bearing block comprising a plastic member having a pair of cylindrically shaped receptacles disposed approximately perpendicularly relative to one another, each cylindrical receptacle having a cylindrical opening therein extending the length of the cylindrical receptacle and having one portion of the receptacle open so that each cylindrical receptacle is generally C-shaped, perimeter portions of each cylindrical receptacle being connected with perimeter portions of the perpendicularly disposed cylindrical receptacle by means of a circumferential wall terminating in a groove extending from perimeter to perimeter of the cylindrical receptacles, the bearing block being received within the interior cavity and secured therein by pin means which extends through said pair of openings and one of the cylindrical receptacles in order to rotatably secure the bearing block within said interior cavity, the cylindrical members of the second rotatable member being received within the other cylindrical receptacle, and a securement ring received securely within the grooves and extending over ends of the other cylindrical receptacle in order to secure the cylindrical members of the second rotatable member within the bearing block, and said securement ring including a pair of oppositely disposed curved portions which extend around portions of the circumference of said pin means, to provide for lash-free movement of the joint in any direction of movement.

2. The universal joint in accordance with claim 1, wherein said securement ring is shrunk into secure engagement with the groove in order to securely retain the cylindrical members within the other cylindrical receptacle.

3. The universal joint in accordance with claim 1, wherein edges of the open portion of the other receptacle provides rotational limit stops for the spaced-apart arms of the second rotatable member.

4. The universal joint in accordance with claim 1, wherein the cylindrical receptacles are positioned backto-back so that the open portions face in opposite directions from one another.

5. A universal joint comprising first and second rotatable members capable of being rotated with their axes angularly disposed with respect to one another, the first rotatable member including a head having an opening communicating with an interior cavity, the head having a pair of openings extending transversely through said head and communicating with said interior cavity, the second rotatable member having a pair of spaced-apart arms located at an end and each spaced-apart arm including a cylindrical member lying along a common axis, characterized in that the joint includes a bearing block comprising a plastic member having a pair of cylindrically shaped receptacles disposed approximately perpendicularly relative to one another, each cylindrical receptacle having a cylindrical opening therein extending the length of the cylindrical receptacle and having one portion of the receptacle open so that each cylindrical receptacle is generally C-shaped, perimeter portions of each cylindrical receptacle being connected with perimeter portions of the perpendicularly disposed cylindrical receptacle by means of a circumferential wall terminating in a groove extending from perimeter to perimeter of the cylindrical receptacles, the bearing block being received within the interior cavity and secured therein by pin means which extends through said pair of openings and one of the cylindrical receptacles in order to rotatably secure the bearing block within said interior cavity, the cylindrical members of the second rotatable member being received within the other cylindrical receptacle, a securement ring received securely within the grooves and extending over ends of the other cylindrical receptacle in order to secure the cylindrical members of the second rotatable member within the bearing block, said securement ring tapered along a longitudinal axis of one of said rotatable members, and said securement ring including a pair of oppositely curved portions which extend around portions of the circumference of said pin means, to provide for lash-free movement of the joint in any direction of movement.

6. The universal joint in accordance with claim 5, wherein edges of the open portion of the other receptacle provides rotational limit stops for the spaced-apart arms of the second rotatable member.

7. The universal joint in accordance with claim 5, wherein the cylindrical receptacles are positioned back-to-back so that the open portions face in opposite directions from one another.

* * * * *